United States Patent
Li

(10) Patent No.: US 7,975,309 B2
(45) Date of Patent: Jul. 5, 2011

(54) SYSTEMS AND METHODS FOR SECURING DATA IN AN ELECTRONIC APPARATUS

(75) Inventor: Ko-Mai Li, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 449 days.

(21) Appl. No.: 12/172,259

(22) Filed: Jul. 13, 2008

(65) Prior Publication Data

US 2009/0106845 A1  Apr. 23, 2009

(30) Foreign Application Priority Data

Oct. 17, 2007  (CN) .......................... 2007 1 0202108

(51) Int. Cl.
*G06F 7/04* (2006.01)
*G06F 17/30* (2006.01)
(52) U.S. Cl. ........................... 726/26; 713/193; 713/200
(58) Field of Classification Search ............... 726/26; 380/247–250, 277–47; 713/193, 200
See application file for complete search history.

(56) References Cited

U.S. PATENT DOCUMENTS

| 2002/0156870 A1* | 10/2002 | Boroumand et al. | ......... 709/219 |
| 2002/0157017 A1* | 10/2002 | Mi et al. | ................ 713/200 |
| 2003/0159056 A1* | 8/2003 | Cromer et al. | ................ 713/193 |
| 2007/0121949 A1* | 5/2007 | Eastham | ........................ 380/278 |
| 2007/0177611 A1 | 8/2007 | Armstrong et al. | |
| 2008/0052217 A1* | 2/2008 | Etkin | ............................... 705/37 |
| 2008/0133791 A1* | 6/2008 | Hodges et al. | .................. 710/33 |

FOREIGN PATENT DOCUMENTS

CN  1622666 A  6/2005

OTHER PUBLICATIONS

English translation of Kim (Chinese Pub. No. CN 1622666 A) published on Jun. 1, 2005, 6 pages.*

* cited by examiner

*Primary Examiner* — Joe H Cheng
(74) *Attorney, Agent, or Firm* — Frank R. Niranjan

(57) ABSTRACT

A method for securing data for an electronic apparatus includes flagging data stored in the electronic apparatus, setting a plurality of security functions corresponding to the flagged data, defining a plurality of hotkeys corresponding to the security functions, and defining a hold-down time for each of the hotkeys. In operation, a user may have to input one or more hotkeys in order to access various functions of the electronic apparatus.

9 Claims, 5 Drawing Sheets

SYSTEMS AND METHODS FOR SECURING DATA IN AN ELECTRONIC APPARATUS

BACKGROUND

1. Field of the Invention

Embodiments of the present disclosure relate to systems and methods for securing data, and more particularly to systems and methods for securing data stored in an electronic apparatus.

2. Description of related art

With the rapid development of communication, portable electronic devices, such as cellular phones and personal digital assistant (PDA) are now in widespread use. At the same time, ensuring data security in the portable electronic devices is becoming increasingly important.

Typical portable electronic devices have a function for authenticating different users, generally by the use of personal passwords or personal identification numbers (PINs). The users are often required to enter their PIN or password before they can access various protected functions of the device. However, these security measures do not protect the device from unauthorized use if the device becomes lost or stolen, particularly if the device is already unlocked and turned on.

Accordingly, what is needed are systems and methods for securing data stored in an electronic apparatus.

SUMMARY

In one aspect, a method for securing data stored in an electronic apparatus is provided. The method includes the following steps: flagging the data stored in the electronic apparatus; assigning at least one security function to the flagged data; assigning at least one hotkey to the at least one security function, and assigning a hold-down time for the at least one hotkey; and executing the at least one security function corresponding to the flagged data upon an indication that the at least one hotkey has been detected.

Other advantages and novel features of the present system and method for providing multiple levels of security will become more apparent from the following detailed description of preferred embodiments when taken in conjunction with the accompanying drawings.

DETAILED DESCRIPTION OF CERTAIN INVENTIVE EMBODIMENTS

Figure 1:
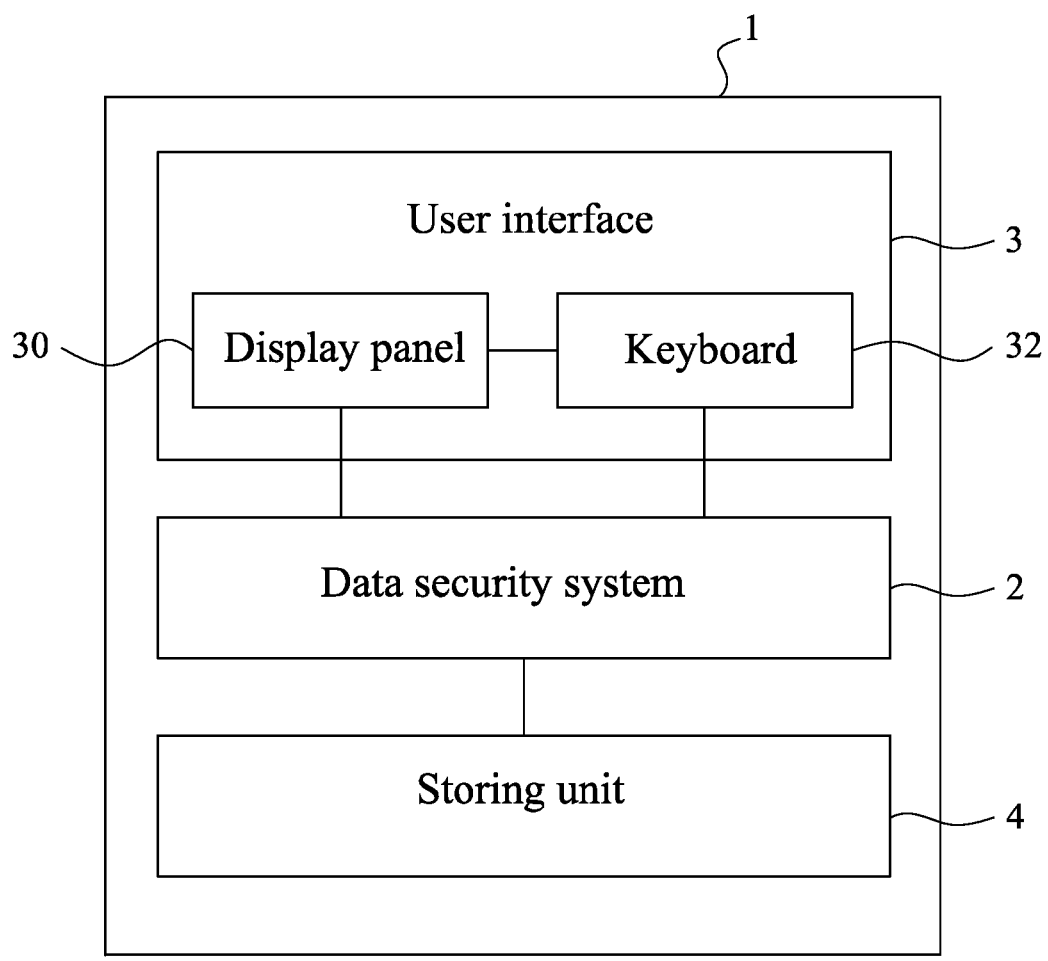
FIG. 1 is a block diagram of one embodiment of an information security system for securing and managing data for an electronic apparatus.

FIG. 1 is a block diagram of one embodiment of a data security system 2 for securing and managing data for an electronic apparatus. The data security system 2 is installed in an electronic apparatus, such as a mobile phone 1. The mobile phone 1 includes a user interface 3, and a storing unit 4, in addition to other hardware and software components of the mobile phone 1. Depending on the embodiment, other portable and non-portable electronic devices, in addition to the mobile phone 1, such as notebook computers, and personal digital assistants (PDAs), for example may use the data security system 2 of the present disclosure.

The user interface 3 provides a human to machine interaction environment for the phone 1. In one embodiment, the user interface 3 includes a display panel 30 and a keyboard 32. The display panel 30 is configured for displaying a graphical user interface (GUI) for the phone 1, such as for displaying applications, short messages, images, and videos, stored in the storing unit 4, or in a subscriber identity module (SIM) card, or other memory cards. The keyboard 32 is an input interface that receives commands and data from a user of the phone 1. It may be appreciated that the keyboard 32 may comprise various input data methods, such as via a keypad, a stylus, or a touch screen.

The storing unit 4 stores electronic data for the phone 1. Depending on the embodiment, the storing unit 4 may be any kind of storage, such as a flash memory, a hard disk, or any other suitable devices that can be used for storing electronic data. In one embodiment, the storing unit 4 may store an operating system and applications that may be executed by a processor (not shown in FIG. 1) embedded in the phone 1. The application may be stored as computerized instructions in the form of a computer-readable medium, such as the storing unit 2, to perform the functions of the present disclosure.

The data security system 2 is configured for providing multiple security functions for different pieces of data that have been identified by a user. In one embodiment, a plurality of hotkeys corresponding to the security functions may be defined so as to protect identified data stored in the phone 1. Further details of the information security system 2 will be disclosed herein.

Figure 2:
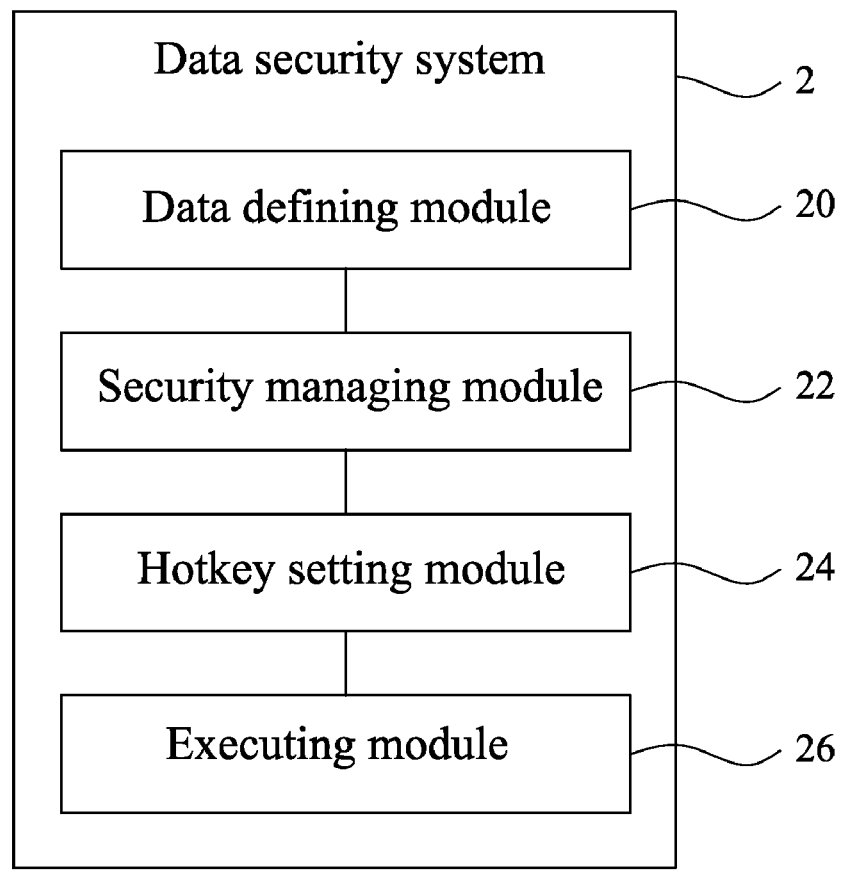
FIG. 2 is a schematic block diagram of one embodiment of the information security system of FIG. 1.

FIG. 2 is a block diagram of one embodiment of the data security system 2 of FIG. 1. The data security system 2 provides a data security interface 5 for managing the identified data (described in detail in relation to FIG. 3), and typically includes a data defining module 20, a security managing module 22, a hotkey setting module 24, and an executing module 26.

The data defining module 20 is configured for selecting and flagging data identified by a user of the phone 1. In one embodiment, the flagged data may include an electronic address book, an electronic short message, an electronic memorandum, and an electronic task, for example. It may be appreciated that the terms "flagged data" or "flagging data" are defined as selecting or receiving one or more data to be deleted, recovered, hid, or revealed, for example.

The security managing module 22 is configured for assigning a plurality of security functions corresponding to the flagged data. In one embodiment, the security functions include, but are not limited to, a deletion function, a recover function, a hide function, and a reveal function for the flagged data. Accordingly, the deletion function may delete the flagged data, the recover function may recover the deleted flagged data, the hide function may temporarily hide the flagged data, and the reveal function may reveal the flagged data hidden by the hide function. The security managing module 22 is further configured for assigning passwords that must be entered in order to invoke any of the above-mentioned security functions.

The hotkey setting module 24 is configured for defining a plurality of hotkeys corresponding to the security functions, and further configured for defining a hold-down time for each of the plurality of hotkeys. It may be understood that a hotkey may be any key of the keyboard 32. For example, the star "★" key may defined as a hotkey for deleting a selected entry or multiple entries in the electronic address book of the phone 1. Additionally, a corresponding hold-down time defined for the "★" hotkey may be 3 seconds, for example. In the above-mentioned example, a user may press the "★" key for three seconds to indicate that one or more address book entries stored in a SIM card on the phone should be deleted. In alternative embodiments, the hotkey can be a combination of keys pressed together or in sequence, such as buttons corresponding to "★", "1", and "2" may be pressed together or in a sequential manner.

The hotkey setting module 24 may be further configured for displaying a confirmation window on the display panel 30 to allow a user to confirm his/her selection of either a deletion, a recover, a hide, or a reveal as indicated above. For example, a confirmation window may be displayed after a hotkey or a hotkey combination is pressed for a predetermined hold-down time period. In one embodiment, the confirmation window may alert a user that a deletion of five address book entries will occur and to press an input key as confirmation of the deletion. Once confirmed of the deletion, a deletion signal will be transmitted to the executing module 26 in order to execute the deletion. In an alternative embodiment, the confirmation step may be skipped so as to save time.

The executing module 26 is configured for executing a corresponding security function for a flagged data after the executing module 26 receives an indication that one or more hotkeys have been detected. For example, the executing module 26 may delete a selected entry in the electronic address after receiving an indication that a "★" has been pressed. It may be understood that one of more generalized or specialized processors in the phone 1 may execute the data defining module 20, the security managing module 22, the hotkey setting module 24, and the executing module 26.

Figure 3:
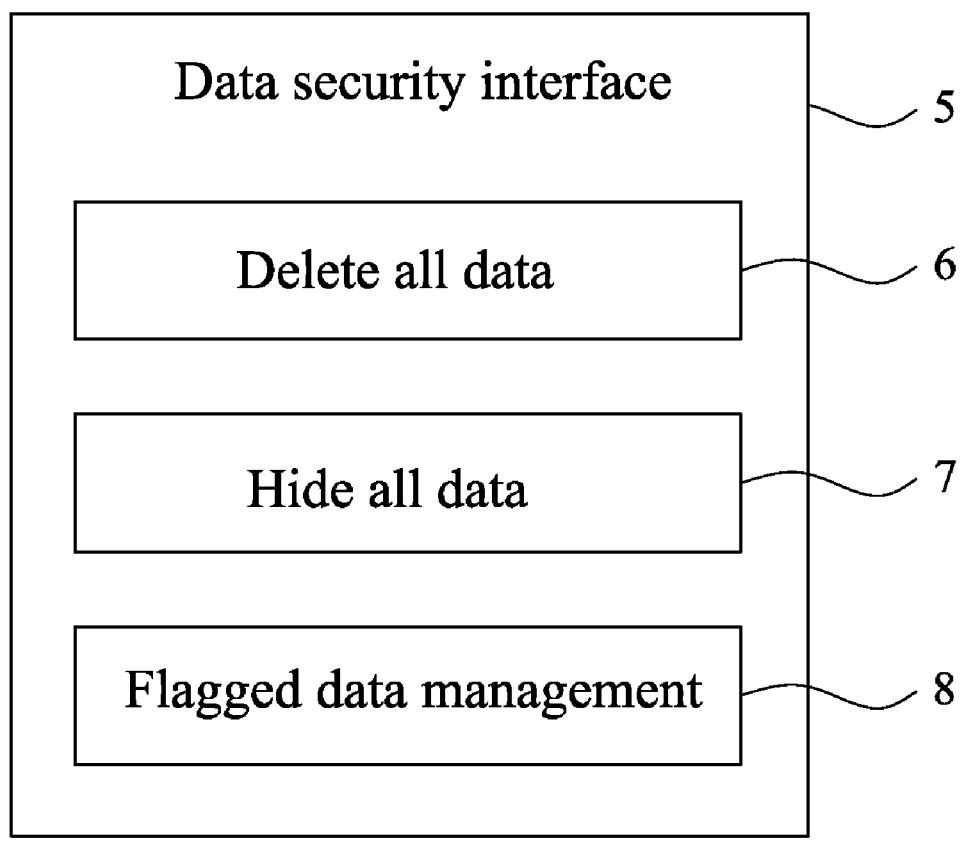
FIG. 3 shows one embodiment of the information security system displaying a data security interface for flagged data in a phone.

FIG. 3 shows one embodiment of the data security system 2 displaying a data security interface 5 for flagged data in the phone 1. The data security interface 5 may be used to apply one or more security functions to the flagged data. In the embodiment of FIG. 3, the data security interface 5 includes security options, such as delete all data 6, hide all data 7, and flagged data management 8. It may be understood that the data security interface 5 may include other security options in addition to the ones previously mentioned. In one embodiment, if the delete all data 6 or the hide all data 7 is selected, then the hotkeys setting module 24 may display a confirmation window confirming either a deletion or a hide function, respectively. In one embodiment, the data security interface 5 may be configured for invoking an authentication process to confirm a user's identity. In one embodiment, the process may occur before the executing module 26 executes the security options.

Figure 4:
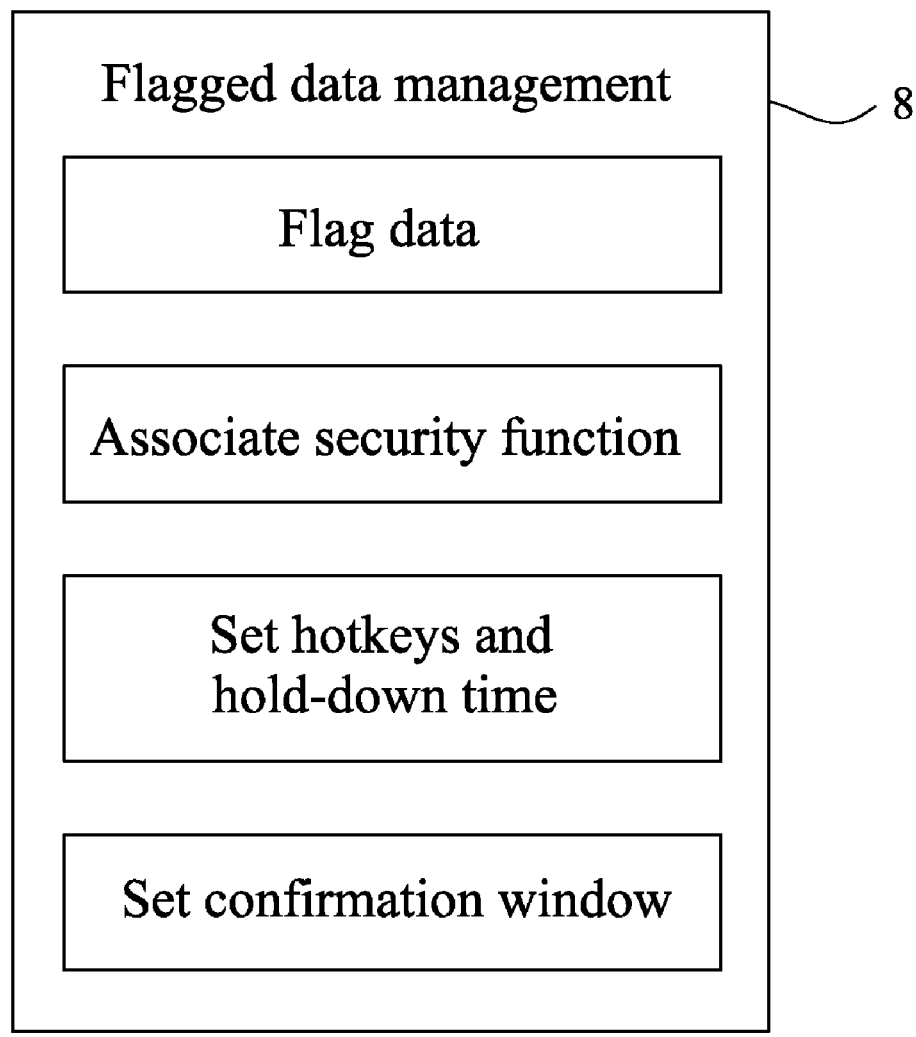
FIG. 4 shows one embodiment of a flagged data management of FIG. 3 to display options for selecting, and managing any flagged and unflagged data on the phone.

FIG. 4 shows one embodiment of a flagged data management 8 of FIG. 3 to display options for selecting, and managing any flagged and unflagged data on the phone 1.

Figure 5:
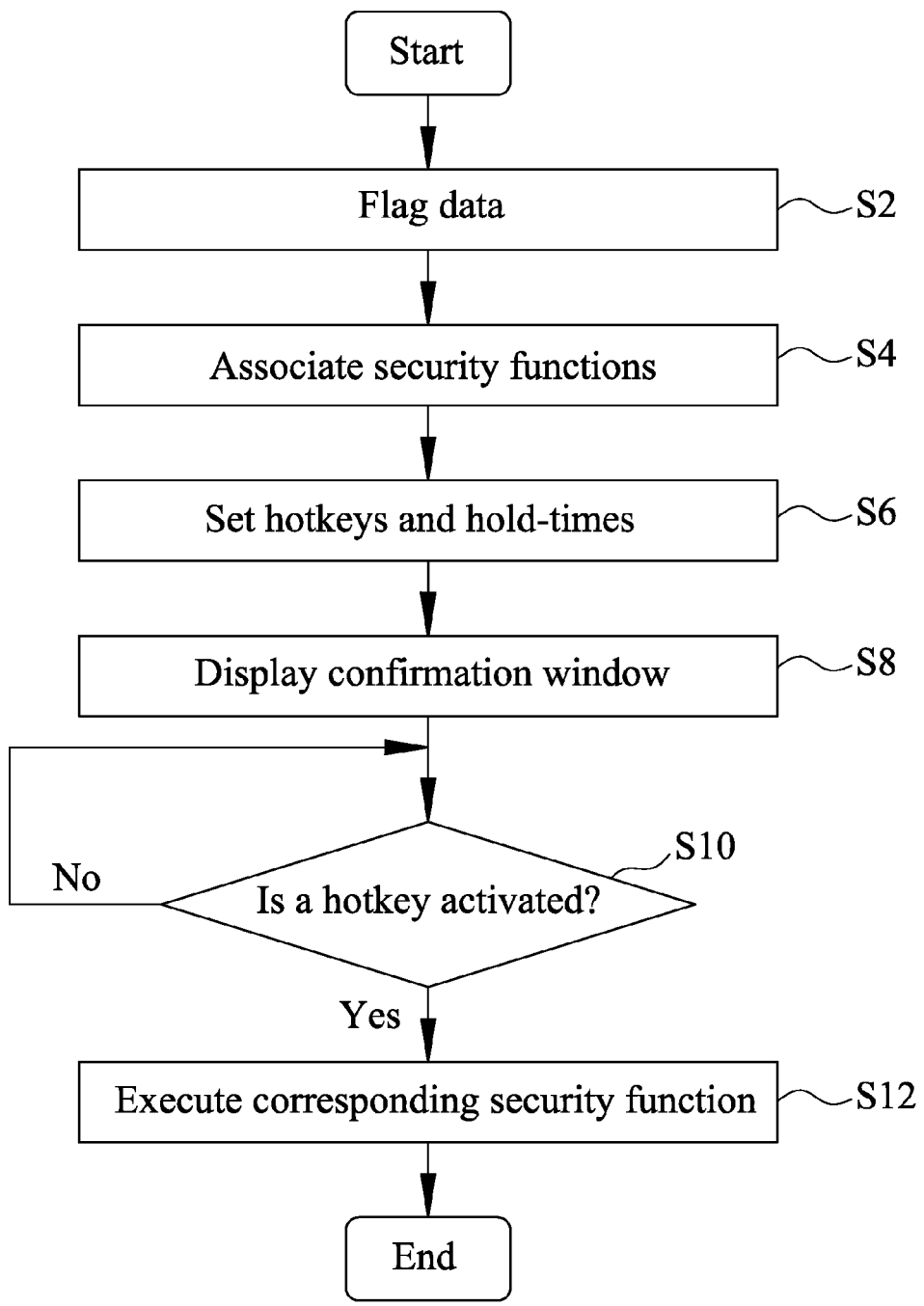
FIG. 5 is a flowchart illustrating one embodiment of a method for securing data for the phone.

FIG. 5 is a flowchart illustrating one embodiment of a method for securing data for the phone 1. In the embodiment of FIG. 5, a user may flag and secure personal data on the phone in order to keep the data private from other users. Depending on the embodiment, certain blocks may be added or removed, and the sequence of the blocks may be altered. In block S2, the data defining module 20 flags data stored in the phone 1 according to input from a user.

In block S4, the security managing module 22 associates at least one security function with the flagged data.

In block S6, the hotkey setting module 24 defines a plurality of hotkeys and hold-times corresponding to the security functions.

In block S8, the hotkey setting module 24 may display a confirmation window for confirming execution of the security function(s).

In block S10, the hotkey setting module 24 determines whether a hotkey has been activated. In block S12, if a hotkey has been activated, then a confirmation window may be displayed for confirming execution of the security functions by the executing module 26. If confirmation is not received, the procedure returns to block S10. In one embodiment, confirmation to execute the security functions may given by a user of the phone 1.

It should be emphasized that the above-described embodiments are merely possible examples of implementations, and set forth for a clear understanding of the principles of the present disclosure. Many variations and modifications may be made to the above-described embodiments without departing substantially from the spirit and principles of the present disclosure. All such modifications and variations are intended to be included herein within the scope of this disclosure and the above-described embodiment(s), and the present disclosure is protected by the following claims.

What is claimed is:

1. A system for securing data stored in an electronic apparatus, comprising:
    a data defining module configured for flagging the data stored in the electronic apparatus;
    a data security interface comprising at least one security function for managing the flagged data, the at least one security function comprising the function of a deletion, a recover, a hide, and a reveal for the flagged data, wherein the hide function may temporarily hide the flagged data and the reveal function may reveal the flagged data hidden by the hide function;
    a security managing module configured for assigning at least one security function to the flagged data;
    a hotkey setting module configured for assigning at least one hotkey to the at least one security function, and further configured for assigning a hold-down time for the at least one hotkey;
    an executing module configured for executing the at least one security function upon the condition that an activation of the at least one hotkey is detected; and
    at least one processor executing the data defining module, the security managing module, the hotkey setting module, and the executing module.

2. The system as claimed in claim 1, wherein the hotkey setting module is further configured for displaying a confirmation window for confirming the at least one security function after the activation of the at least one hotkey.

3. The system as claimed in claim 1, wherein the flagged data comprises at least one of an electronic address book, an electronic short message, an electronic memorandum, and an electronic task stored on the electronic apparatus.

4. A method for securing data stored in an electronic apparatus, comprising:
    flagging the data stored in the electronic apparatus;
    assigning at least one security function to the flagged data;
    assigning at least one hotkey to the at least one security function, the at least one security function comprising the function of a deletion, a recover, a hide, and a reveal for the flagged data, wherein the hide function may temporarily hide the flagged data and the reveal function may reveal the flagged data hidden by the hide function, and assigning a hold-down time for the at least one hotkey;

detecting whether at least one hotkey has been activated; and executing the at least one security function corresponding to the flagged data upon an indication that the at least one hotkey has been detected.

5. The method as claimed in claim 4, wherein the executing block further comprises:

displaying a confirmation window for confirming execution of the at least one security function upon an indication that the at least one hotkey has been detected.

6. The method as claimed in claim 4, wherein the flagged data comprises at least one of an electronic address book, an electronic short message, an electronic memorandum, and an electronic task stored on the electronic apparatus.

7. A non-transitory computer-readable medium having stored thereon instructions that, when executed by an electronic device, cause the electronic device to:

flag a data stored in the electronic apparatus;

assign at least one security function to the flagged data;

assign at least one hotkey to the at least one security function, the at least one security function comprising the function of a deletion, a recover, a hide, and a reveal for the flagged data, and assigning a hold-down time for the at least one hotkey, wherein the hide function may temporarily hide the flagged data and the reveal function may reveal the flagged data hidden by the hide function, and assign a hold-down time for the at least one hotkey;

detect whether at least one hotkey has been activated; and execute the at least one security function corresponding to the flagged data upon an indication that the at least one hotkey has been detected.

8. The non-transitory computer-readable medium in claim 7, wherein the assigning the at least one hotkey comprises selecting one or more keys on the electronic device.

9. The non-transitory computer-readable medium in claim 8, wherein the selection of one or more keys on the electronic device is selected via a key depression, a stylus, or a touch screen.

* * * * *